United States Patent
Perry, Sr.

(10) Patent No.: US 8,365,986 B2
(45) Date of Patent: Feb. 5, 2013

(54) CREDIT CARD SECURITY SYSTEM AND METHOD

(75) Inventor: Daniel D. Perry, Sr., Loudon, NH (US)

(73) Assignee: Perry Securities LLC, Pelham, NH (US)

(*) Notice: Subject to any disclaimer, the term of this patent is extended or adjusted under 35 U.S.C. 154(b) by 145 days.

(21) Appl. No.: 11/717,302

(22) Filed: Mar. 13, 2007

(65) Prior Publication Data

US 2007/0215698 A1    Sep. 20, 2007

Related U.S. Application Data

(60) Provisional application No. 60/782,562, filed on Mar. 14, 2006.

(51) Int. Cl.
*G06K 5/00* (2006.01)
(52) U.S. Cl. .................................. 235/380
(58) Field of Classification Search .......... 235/380; 705/17, 35, 39, 64
See application file for complete search history.

(56) References Cited

U.S. PATENT DOCUMENTS

| | | | |
|---|---|---|---|
| 3,511,181 A | 5/1970 | McGiffin, et al. | |
| 4,507,550 A | 3/1985 | Fleer | |
| 4,643,453 A | 2/1987 | Shapiro et al. | |
| 4,931,629 A | 6/1990 | Frankfurt | |
| 5,432,864 A * | 7/1995 | Lu et al. | 382/118 |
| 5,648,647 A * | 7/1997 | Seiler | 235/380 |
| 5,979,773 A * | 11/1999 | Findley et al. | 235/492 |
| 5,984,366 A | 11/1999 | Priddy | |
| 6,138,917 A * | 10/2000 | Chapin, Jr. | 235/487 |
| 6,256,737 B1 * | 7/2001 | Bianco et al. | 713/186 |
| 6,298,441 B1 * | 10/2001 | Handelman et al. | 713/185 |
| 6,374,757 B1 | 4/2002 | Farkash | |
| 6,802,452 B2 | 10/2004 | Lebaschi et al. | |
| 2001/0047223 A1 * | 11/2001 | Metcalf et al. | 700/237 |
| 2002/0087413 A1 * | 7/2002 | Mahaffy et al. | 705/16 |
| 2004/0006695 A1 * | 1/2004 | Ishibashi et al. | 713/175 |
| 2005/0080730 A1 * | 4/2005 | Sorrentino | 705/39 |
| 2005/0087598 A1 | 4/2005 | Yamanaka et al. | |

(Continued)

FOREIGN PATENT DOCUMENTS

CA 1241746 9/1988
GB 2290053 A 12/1995

OTHER PUBLICATIONS

"MR-2000/MR-3000 Magnetic Stripe Reader," Posiflex, Mustek Corporation, an ISO-9002 certified manufacturer.

(Continued)

*Primary Examiner* — Daniel Hess
(74) *Attorney, Agent, or Firm* — Hamilton, Brook, Smith & Reynolds, P.C.

(57) ABSTRACT

A transaction method, system and apparatus of the present invention employs two electromagnetically read cards. A first card is employed for accessing account data of a corresponding account. A second card effectively carries identity data of the owner/account holder of the first card. During a transaction, the two cards must be used sufficiently in tandem or in proper series order, in order for the card processing center to authorize the subject transaction. In particular, use of the first card accesses a corresponding account to determine if the account is active versus in a halted state (e.g., due to a reported stolen or lost card). Use of the second card spaced apart (in time and/or in distance) from the first card then verifies identity of the user as an authorized person to be accessing the corresponding account and hence authorized user of the first card. As such the second card verifies, validates, authenticates or otherwise confirms identity of the first card owner (also referred to as the corresponding account owner) and serves as an identity data member.

22 Claims, 4 Drawing Sheets

U.S. PATENT DOCUMENTS

| | | | |
|---|---|---|---|
| 2005/0242172 A1 | 11/2005 | Murata | |
| 2005/0242173 A1 | 11/2005 | Suzuki | |
| 2006/0015730 A1* | 1/2006 | Yuhara | 713/175 |
| 2006/0129485 A1 | 6/2006 | Hamzy et al. | |
| 2006/0282372 A1 | 12/2006 | Endres et al. | |

OTHER PUBLICATIONS

"DED Limited, PoS, Card, Kiosk," MR-2000/3000 Series Metal Cased Magnetic Swipe Reader, [online], [retrieved on Jan. 17, 2007], Retrieved from the Internet: http://www.ded.co.uk/data_sheet/Data_mr2000_3000.html.

AIM—The Global Trade Association for Automatic Identification and Mobility—AIDC Technologies, p. 1, [online], [retrieved on Jan. 18, 2007], Retrieved from the Internet: http://www.aimglobal.org/technologies/.

AIM—The Global Trade Association for Automatic Identification and Mobility—Magnetic Stripe Glossary, pp. 1-33, [online], [retrieved on Jan. 18, 2007], Retrieved from the Internet: http://www.aimglobal.org/technologies/card/msglossary.asp.

AIM—The Global Trade Association for Automatic Identification and Mobility—Card Technologies, pp. 1-2, [online], [retrieved on Jan. 18, 2007], Retrieved from the Internet: http://www.aimglobal.org/technologies/card.

AIM—The Global Trade Association for Automatic Identification and Mobility—Magnetic Stripe: Key Attributes and Limitations, pp. 1-2, [online], [retrieved on Jan. 18, 2007], Retrieved from the Internet: http://www.aimglobal.org/technologies/card/magnetic_stripe.asp.

AIM—The Global Trade Association for Automatic Identification and Mobility—Common Applications, pp. 1-2, [online], [retrieved on Jan. 18, 2007], Retrieved from the Internet: http://www.aimglobal.org/technologies/card/card_applications.asp.

AIM—The Global Trade Association for Automatic Identification and Mobility—Case Studies—Modified Frequency Modulation (MFM)—Encoding for Magnetic Stripes, pp. 1-4, [online], [retrieved on Jan. 18, 2007], Retrieved from the Internet: http://www.aimglobal.org/technologies/card/mfmencoding.asp.

AIM—The Global Trade Association for Automatic Identification and Mobility—Frequently Asked Questions, pp. 1-6, [online], [retrieved on Jan. 18, 2007], Retrieved.from the Internet: http://www.aimglobal.org/technologies/card/magnetic_stripe_faqs.htm.

Magnetic Stripe Card—from Wikipedia, the free encyclopedia, pp. 1-5, [online], [retrieved on Jan. 17, 2007], Retrieved from the Internet: http://en.wikipedia.org/wiki/Magnetic_stripe_card.

IDAT Consulting/Overview of Magnetic Stripe Technology, Introduction to AIDC Technologies, pp. 1-2, [online], [retrieved on Jan. 17, 2007], Retrieved from the Internet: http://www.idat.com/t-magstripe.html.

"How Stuff Works—it's good to know," pp. 1-4, [online], [retrieved on Jan. 18, 2007], Retrieved from the Internet: http://money.howstuffworks.com/question503.htm.

Brain, M., "*How Tape Recorders Work*," How Stuff Works—it's good to know, pp. 1-5, [online], [retrieved on Jan. 18, 2007], Retrieved from the Internet: http://money.howstuffworks.com/cassette.htm/printable.

"Introduction to Magnetic Stripe & Other Card Technologies," presented at SCAN-TECH ASIA 97, Singapore, Apr. 24, 1997, pp. 1-8, [online], [retrieved on Jan. 17, 2007], Retrieved from the Internet: http://hightechaid.com/tech/card/intro_ms.htm.

Visdomine, Luis Padilla, "Track format of Magnetic Stripe Cards," pp. 1-11, [online], [retrieved on Jan. 17, 2007], Retrieved from the Internet: http://www.gae.ucm.es/~padilla/extrawork/tracks.html.

"DED Limited, PoS, Card, Kiosk," FAQ: Magnetic Stripe Card Standards, pp. 1-4, [online], [retrieved on Jan. 17, 2007], Retrieved from the Internet: http://www.ded.co.uk/magnetic-stripe-card-details.html.

Tech FAQ—http://www.tech-faq.com—What Is the Layout of Data on Magnetic Stripe Cards?, pp. 1-4, [online], [retrieved on Jan. 18, 2007], Retrieved from the Internet: http://www.tech-faq.com/mag-stripe-cards.shtml.

Global Spec—The Engineering Search Engine—About Magnetic Stripe Card Readers and Encoders, pp. 1-3, [online], [retrieved on Jan. 17, 2007], Retrieved from the Internet: http://data-acquisition.globalspec.com/LearnMore/Data_Acquisition_Signal_Conditioning/ . . . .

Tech FAQ—http://www.tech-faq.com—How Does a Magnetic Stripe Card Reader Work?, pp. 1-3, [online], [retrieved on Jan. 18, 2007], Retrieved from the Internet: http://www.tech-faq.com/magnetic-card-reader.shtml.

"DED Limited, PoS, Card, Kiosk," Introduction—MCR 300 Series Manual Insertion Magnetic Stripe Reader, pp. 1-2, [online], [retrieved on Jan. 17, 2007], Retrieved from the Internet: http://www.ded.co.uk/data_sheet/Data_mcr-300.html.

"DED Limited, PoS, Card, Kiosk," Introduction—MCR 900 Series Manual Insertion Magnetic Stripe Reader, pp. 1-2, [online], [retrieved on Jan. 17, 2007], Retrieved from the Internet: http://www.ded.co.uk/data_sheet/Data_mcr-900.html.

"DED Limited, PoS, Card, Kiosk," Introduction—MTM 400 Series Motorised Magnetic Stripe Reader/Writer, pp. 1-3, [online], [retrieved on Jan. 17, 2007], Retrieved from the Internet: http://www.ded.co.uk/data_sheet/Data_mtm-400.html.

"DED Limited, PoS, Card, Kiosk," Introduction—MTM 500 Series Motorised Magnetic Stripe Reader, pp. 1-2, [online], [retrieved on Jan. 17, 2007], Retrieved from the Internet: http://www.ded.co.uk/data_sheet/Data_mtm-500.html.

AIM —The Global Trade Association for Automatic Identification and Mobility—Magnetic Stripe Equipment, pp. 1-3, [online], [retrieved on Jan. 18, 2007], Retrieved from the Internet: http://www.aimglobal.org/technologies/card/msbasics.asp.

Baard, M., Chameleon Card Changes Stripes [online], Mar. 2004 [retrieved on Dec. 2, 2005]. Retrieved from the internet <URL: http://www.wired.com/news/business/0,1367,62545,00.html>.

Arnold, K., Credit Card Purchases in a Blink, [online], [retrieved on Dec. 2, 2005]. Retrieved from the internet <URL:http://www.bankrate.com/brm/news/cc/20050613a1.asp>.

What is a Smart Card?, [online], [retrieved on Dec. 2, 2005]. Retrieved from the internet <URL:http://electronics.howstuffworks.com/question332.htm>.

How Credit Cards get Cloned, [online], Jan. 2001[retrieved on Dec. 2, 2005]. Retrieved from the internet <URL:http://news.bbc.co.uk/1/hi/uk/1097797.stm>.

www.internetretailer.com, "Authorized.Net Partners with CardinalCommerce to Integrate Payment Authentication Software into Its Payment Gateway," retrieved from Internet Mar. 6, 2008.

[online] "Sam's Club—Security & Privacy," www.samsclub.com/shopping/navigate.do?catg=11148; retrieved from internet Aug. 27, 2008, 5 pages.

[online] "Sam's Club—Security & Privacy," www.samsclub.com/shopping/navigate.do?catg=580; retrieved from internet Aug. 27, 2008, 4 pages.

[online] "Sam's Club—Security & Privacy," www.samsclub.com/shopping/navigate.do?catg=4539; retrieved from internet Aug. 27, 2008, 2 pages.

Press Release and Product Data Sheet from E-Seek Incorporated, "E-Seek Issued Patent on Unique 2D BarCode Reader," E-Seek, San Diego, CA, Oct. 12, 2004, 3 pages.

* cited by examiner

CREDIT CARD SECURITY SYSTEM AND METHOD

RELATED APPLICATION

This application claims the benefit of U.S. Provisional Application No. 60/782,562 filed on Mar. 14, 2006. The entire teachings of the above application are incorporated herein by reference.

BACKGROUND OF THE INVENTION

Many monetary transactions are performed using a plastic card with a data carrying magnetic stripe. Examples are credit cards, debit cards, telephone calling cards, ATM cards and gift cards. There are other transactions (non-monetary included) that use such electromagnetically read plastic cards.

The problems with such plastic cards include piracy and identity theft. The British Broadcasting Corporation reports card cloning or "skimming" has doubled in the United Kingdom in the past year with the resulting thefts up to millions of dollars. See "How Credit Cards Get Cloned", news.bbc.co.uk, Thursday, Jan. 4, 2001.

SUMMARY OF THE INVENTION

The present invention addresses the foregoing problems in the prior art. In particular, the present invention provides increased security of identity data of card owners of magnetically read cards.

In one embodiment, a transaction method, system and apparatus of the present invention employs two electromagnetically read cards. A first card is employed for accessing account data of a corresponding account. A second card effectively carries identity data of the owner/account holder of the first card. During a transaction, the two cards are used sufficiently in tandem or in proper series order, in order for the card processing center to authorize the subject transaction. In particular, use of the first card accesses a corresponding account to determine if the account is active versus in a halted state (e.g., due to a reported stolen or lost card). Use of the second card spaced apart (in time and/or in distance) from the first card then verifies identity of the user as an authorized person to be accessing the corresponding account and hence authorized user of the first card. As such the second card verifies, validates, authenticates or otherwise confirms identity of the first card owner (also referred to as the corresponding account owner) and serves as an identity data member.

Preferably the identity data member is universal and thus usable with other credit/debit/transaction cards. That is, an individual may own several credit/debit cards and the like but need only have one identity data card which is usable in tandem/series with each such credit, debit card or other transaction type card in the manner described above.

In order to deter piracy and theft, the second card (identity data member) is encoded or programmed so as to not be usable before a first card to access an account and causes generation of error signals if not used properly in succession after a first card (i.e., if used other than second in turn).

In other embodiments, the identity data member is a transaction card with a digital processing chip instead of electromagnetically readable stripe. Other alternative embodiments include use of RF (radio frequency) technology or similar for the identity data member to reduce the ability to be skimmed (cloned). In that embodiment, the identity data member includes an electronic tag (or digital processing chip plus radio frequency antenna) that electronically communicates the identity data to the system. The card reader may be wireless or otherwise configured to further accommodate the present invention.

In other embodiments, the identity data member enables credit history requests and other personal records requests to be initiated in a paperless fashion.

In another embodiment, the identity data member enables requests of a digital image of the authorized user/account owner to be initiated. An authorized user/account owner updates the digital image.

In yet another embodiment, a first or second card uses multiple magnetic stripes for storing data.

In still yet another embodiment, a respective data carrying magnetic stripe of the first or second card uses a Track 1 and a Track 2 for storing data. The Track 1 and Track 2 contains either a 7-bit alphanumeric characters or a 5-bit numeric characters.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
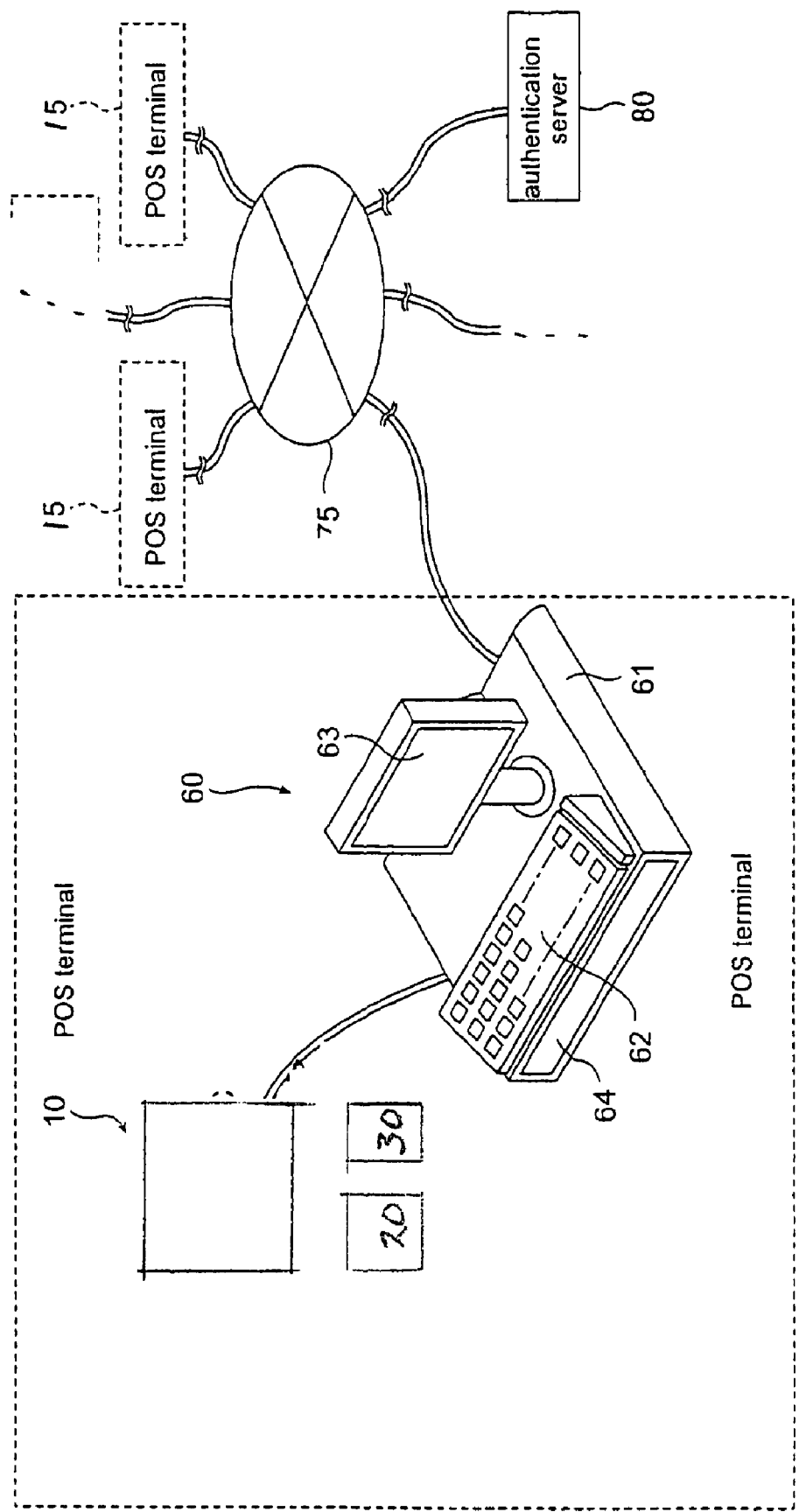
FIG. 1 is a schematic view of a point of sale system and network employing embodiments of the present invention.

A description of preferred embodiments of the invention follows.

The subject invention is described below for use at a point of sale (POS) terminal 60 such as in restaurants and retail stores. The POS terminal 60 includes a cash register 61 and a card reader 10. The cash register 61 is of conventional type with a display 63, keypad 62, and drawer 64.

The card reader 10 is a common magnetic reader and is connected over a network (e.g., Ethernet, telephone, cable net, or other suitable connection) 75 to an authentication server 80 for verifying and authorizing a credit card transaction. The authentication server 80 is operated by a credit card company or clearing house (an organization that contracts with multiple credit card companies to provide centralized credit checks and risk evaluation services).

Card reader 10 may be of the wireless or any variety of types used in the industry.

During a transaction in the present invention, card reader 10 reads a first of two credit cards 20, 30. In particular, card information such as a card number is read from the first credit card 20 and transmitted by the card reader 10 to the authentication server 80. In response, the authentication server 80 runs a credit check to verify if the credit card 20 was reported lost or stolen or if the corresponding credit card account is inactive for any other reason. The authentication server 80 returns the risk evaluation result to the POS terminal 60.

Next data from the second 30 of the two cards of the present invention is read by the card reader 10 and provides information regarding the owner of the two cards 20, 30. The card reader 10 transmits this magnetically read identity data (from second card 30) to the authentication server 80 for matching to the subject credit card account (accessed by the first credit card 20). Specifically, authentication server 80 queries its datastore for owner and authorized user information of the subject credit card account as stored by authentication server 80 or otherwise recorded from the financial institution (e.g., bank) issuing the first credit card 20. If the transmitted identity data from the second card 30 does not match the account owner/authorized user information for the first card 20, then the authentication server 80 does not approve the transaction and returns a pertinent indication (message) to the POS terminal 60.

In other embodiments, any number of credit cards owned by an individual may be used as the first credit card 20 above. The same one identity data (second) card 30 is universally usable with each qualifying first credit card to provide the above described authentication (e.g., identity verification).

Further, if the second card 30 is used (read) preceding the first card 20, the authentication server 80 prevents any current transaction at POS terminal 60. That is, the data encoded on second card 30 does not include a valid or working credit card account number. Alternatively, the encoded data may otherwise indicate that second card 30 is a decoy credit card carrying identity data to serve only as a security check (and not as a typical account accessing transaction initiating means). Thus the authorized card user (account owner) is the only one who apparently knows which credit card serves as the identity data card 30 that is to be used second in succession with a qualifying first credit card 20.

In another embodiment, the identity date of the second card 30 may also include a digital image of the account owner/authorized user. A card reader 10 transmits this magnetically read digital image (from second card 30) to an authentication server 80 for matching to the subject credit card account (accessed by the first credit card 20). Specifically, authentication server 80 queries its datastore for the owner and authorized user of the subject credit card account as stored by authentication server 80. The authentication server 80 returns a stored digital image to a vendor. The vendor visually inspects the returned visual image with a person using the second credit card 30. If the transmitted digital image from the second card 30 does not match the person using the second credit card 30, the vendor will not approve the transaction. It is useful to note that a person should update the digital image corresponding to their second card 30.

Other POS terminals 15 of respective merchants are similarly capable of processing tandem/serial credit cards 20, 30 of the present invention by connecting to authentication server 80 through network 75.

The first and second credit cards 20, 30 of the present invention are encoded using known technology. Any number of encoders which magnetically encode data onto magnetic strips known in the art may be used. For example, the encoder may include a magnetic imprinter of conventional design for erasably imprinting the below described indicia on stripes 22, 32 (FIGS. 2b, 3b) of conventional temporarily magnetizable material such as is commonly used on credit cards. Stripes 22, 32 extend along appropriate substrates on the back of the cards 20, 30.

Typically a magnetic stripe card includes a magnetic stripe within a plastic-like film. The magnetic stripe is located about 0.223 inches from the edge of the card, and is about 0.375 inches wide. The magnetic stripe may also operatively contain three tracks, each about 0.110 inches wide. Tracks one and three are typically recorded at about 210 bits per inch, while track two typically has a recording density of about 75 bits per inch. Each track can either contain 7-bit alphanumeric characters, or 5-bit numeric characters. Financial transactions typically use up to three tracks on magnetic cards. Following industry protocol or industry standards, these tracks are named Track 1, Track 2, and Track 3. Currently, Track 3 remains unused by the major worldwide networks. In fact, Track 3 is not physically present on many of the magnetic cards in use. A Point-of-sale card readers almost always read track 1, or track 2, and sometimes both, in case one track is unreadable. The minimum cardholder account information needed to complete a transaction is present on both tracks. Track 1 has a higher bit density (210 bits per inch vs. 75), is the only track that may contain alphabetic text, and hence is the only track that contains the cardholder's name.

A track format is written with a 5-bit scheme (4 data bits+1 parity), which allows for sixteen possible characters, which are the numbers 0-9, plus the six special characters (e.g., : ; < = > ?). The data format typically includes a start sentinel, primary account number, separator, expiration date, service code, discretionary data, end sentinel, and LRC (Longitudinal Redundancy Check).

Figure 2A:
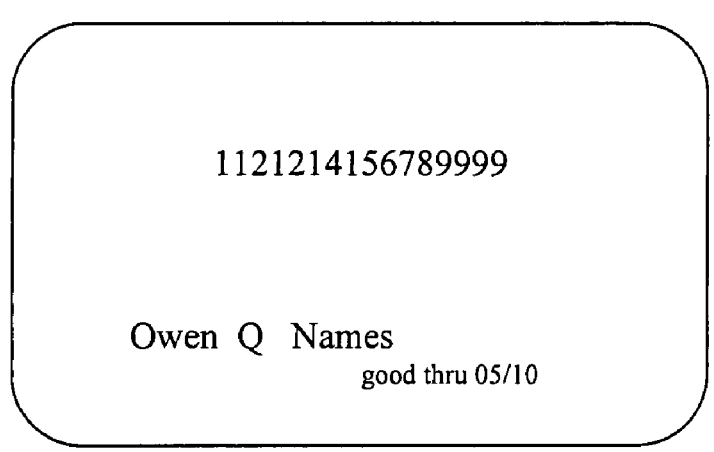
FIGS. 2a and 2b are schematic views of a first credit card.
Figure 2B:
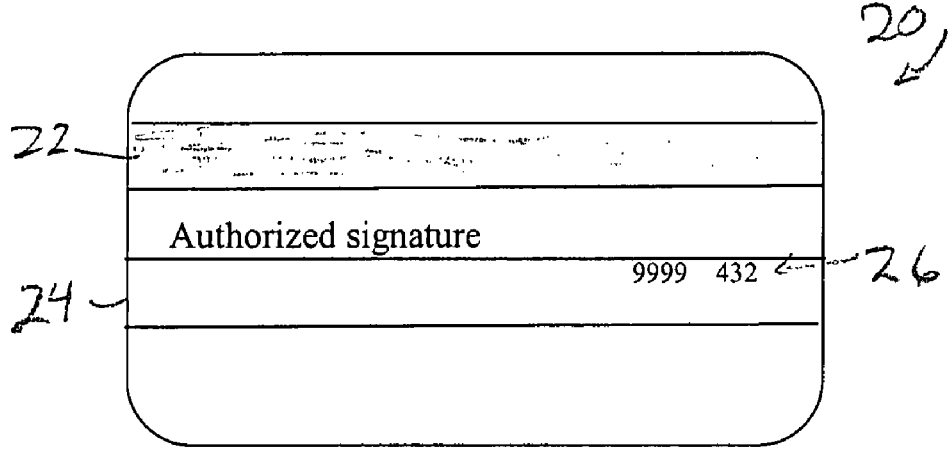

In accordance with the principles of the present invention, the magnetic stripe 22 (FIG. 2b) on the back surface of a qualifying first credit card 20 is encoded with account data, such as a credit card account number, bank identifier, etc. In an embodiment, a first or second card 20, 30 may use two magnetic stripes for storing data. For example, a magnetic stripe may be used for each Track. The front surface of credit card 20 bears the credit card account number, name of the card (and account) owner and other indicia as typical in the industry. FIG. 2a is illustrative. An authorized user places his signature on the back of card 20 in a designated area 24 shown in FIG. 2b. An n-digit code 26 appears in the signature area 24 of the credit card 20 and serves as extra security by means known in the art.

Figure 3A:
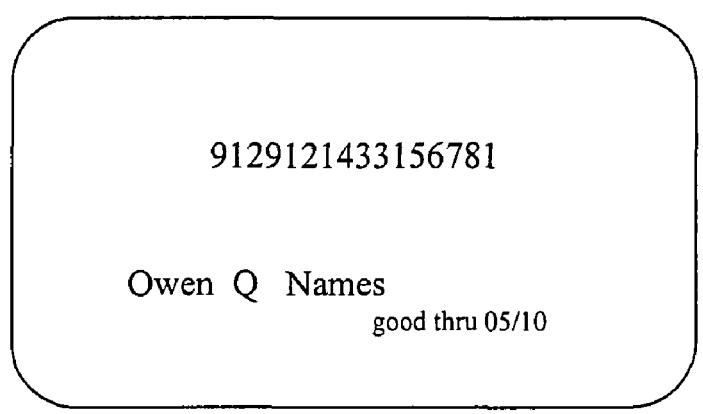
FIGS. 3a and 3b are schematic views of an identity data member of the present invention.
Figure 3B:
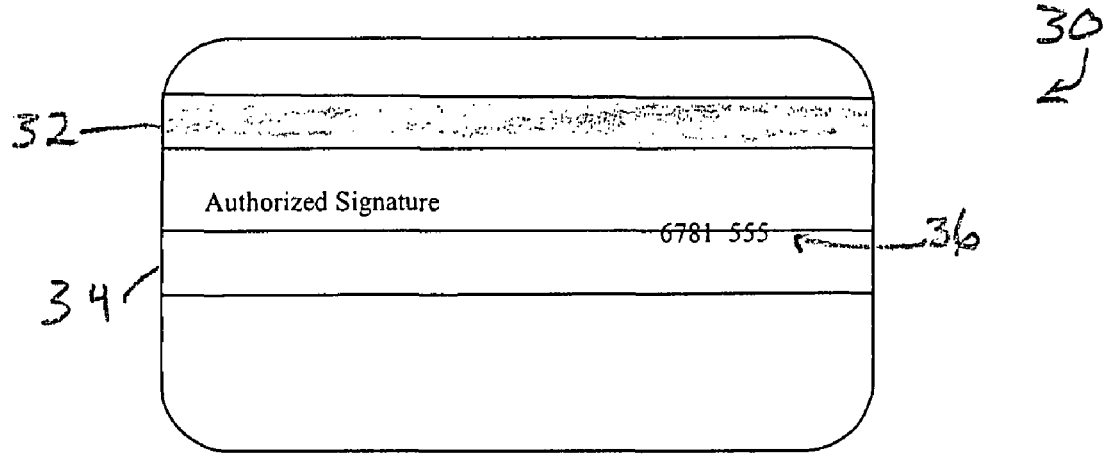

The second credit card 30, serving as the identity data member of the present invention, is encoded with name of the authorized user and/or owner and holder of accounts corresponding to qualifying first credit cards 20. Means for linking to or otherwise referencing those accounts may also be encoded on second card 30. In one embodiment, the magnetic stripe 32 (FIG. 3b) of the second credit card 30 holds only account owner (or authorized user) identity data matching the account owner (authorized user) data of the accounts of qualifying first credit cards 20 without the second card's 30 account number data and information normally encoded on credit cards. However, as shown in FIGS. 3a and 3b, the front and back side of the second credit card 30 from all appearances look like a credit card and bears a credit card number, signature area 34 with n-digit code 36 and other indicia as a decoy. That is, the second credit card 30 is encoded in a manner such that a transaction cannot be initiated by the second credit card 30 but only authorized user identity is verified or otherwise validated. In this way, those not familiar with the two cards 20, 30 cannot easily distinguish which is the identity data card 30 and which is a conventional credit card usable for initiating transactions. Only the authorized user/owner of the credit cards 20, 30 knows the distinction either based on the printed card number on the face of the cards or the n-digit code 26, 36 or other security number printed on the back of the cards. In some embodiments, the account number on the face of the second card 30 is effectively an inactive account number as interpreted by the authentication server 80.

Other decoy indicia and fashioning of a second credit card 30 are suitable. For example, second credit card/identity data member 30 may appear as a gift card, telephone calling card, library card, fundraising card, a card for a random organization or entity, etc.

In other embodiments, the first and/or second credit cards may employ digital processor chips instead of magnetic stripes 22, 32 for carrying respective data.

In another embodiment, the second credit card or identity data member 30 is implemented using RF technology. Radio-frequency identification (RFID) is an automatic identification method, relying on storing and remotely retrieving data using devices called RFID tags or transponders. An RFID tag is an object that can be attached to or incorporated into a product, such as a credit card for the purpose of identification using radio waves. Chip-based RFID tags contain silicon chips and antennas. The card 30 has (i) a digital chip and radio frequency antenna or (ii) an electronic tag for electronically communicating the authorized user identity data to authentication server 80.

In other embodiments, smart cards containing an integrated circuit chip are used. A smart card, chip card, or integrated circuit(s) card (ICC), is a pocket-sized card with embedded integrated circuits.

In another embodiment, the identity data member (second card) 30 is used to electronically communicate name, address and other personal identity data of an authorized user (card owner and account holder). For example, such communication may be to a credit bureau in a request for credit history such as by a real estate office, mortgage broker, car dealer, etc. A card reader 10 in that example transmits the read identity data over a network 75 to a credit bureau server (not shown) programmed to process such requests. In response, the credit bureau server searches and finds credit records corresponding to the subject user and generates a credit history report. Authentication server 80 may serve as such a credit bureau server or may be coupled to communicate to one. Other configurations are suitable and in the purview of one skilled in the art, given this disclosure of the present invention.

For example, on-line shopping (via the Internet) using the invention dual cards 20, 30 approach (method) of the present invention may occur as follows. The user enters account data from first credit card 20 as prompted. When prompted to enter the additional security code from the back of the credit card, the user enters the code 36 from the back of the second card 30. The authentication server 80 is programmed to match this security code 36 with the authorized user of qualifying first credit card 20 and corresponding credit card account. This effectively validates, authenticates or otherwise confirms that the end-user is a legitimate (authorized) user of the first credit card 20.

Further authentication server 80 is programmed by known means and techniques to properly interpret the serial or tandem reading of the invention cards 20, 30 as described above. A time threshold between the two readings or other spacing between the reading of the two cards 20, 30 may be utilized (so that if the second card 30 does not readily follow the reading of the first card 20, authentication server 80 denies/does not approve the transaction). Database indexes, links or other techniques may be employed by authentication server 80 to implement the cooperation between the first credit card 20 (account data) and the identity data card 30 (authorized user data) in the many embodiments described above.

Figure 4:
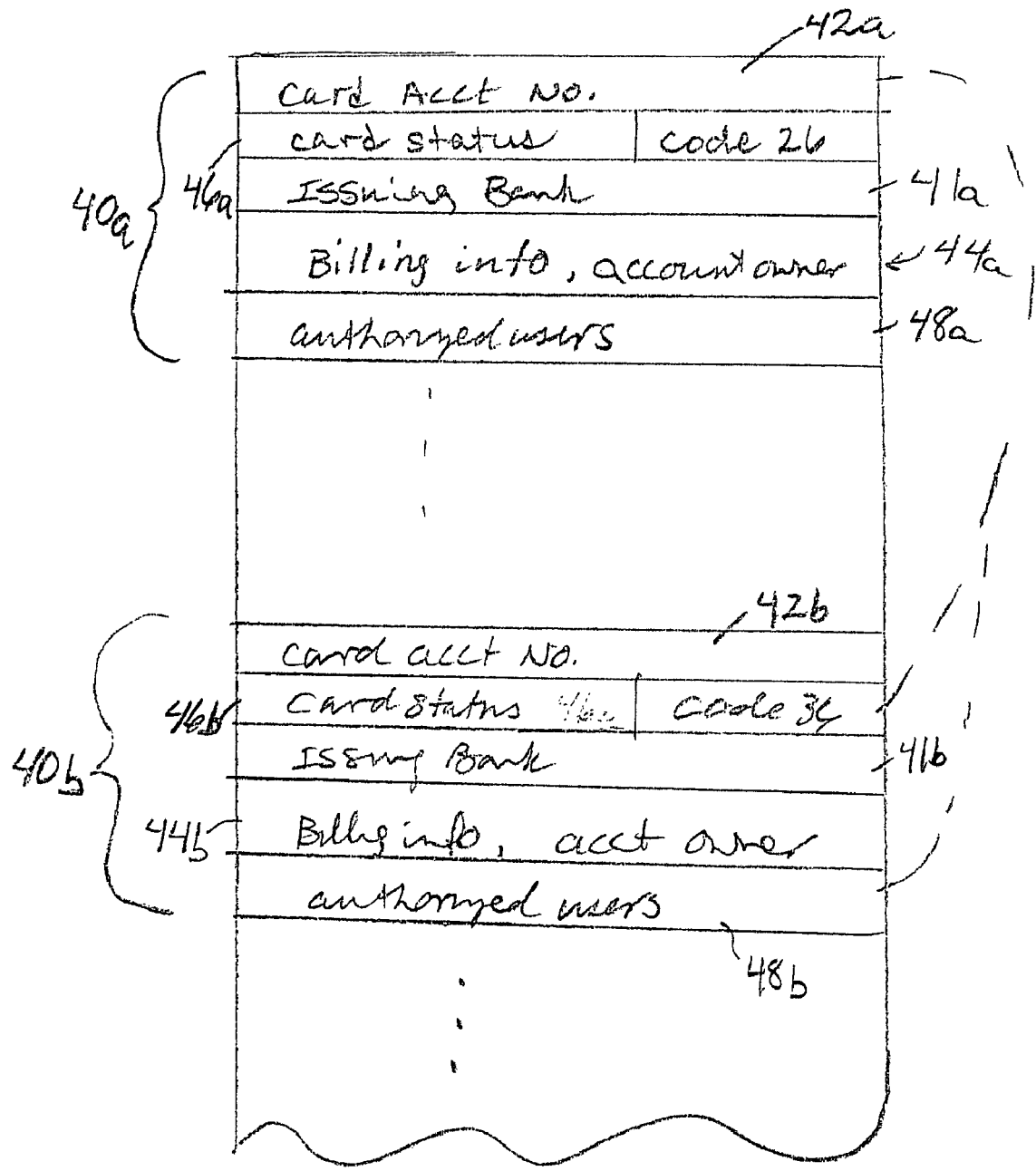
FIG. 4 is a block diagram of datastore records employed in the system of FIG. 1.

For example, in a database or other datastore accessible by authentication server 80, there is one record 40 (FIG. 4) per credit card account. For a given credit card account, the respective record 40a has a field for holding the credit card (account) number such as at 42 in FIG. 4. This field 42a may serve as an index to the record 40a enabling authentication server 80 to find the record based on a search (query) using the credit card number. The record 40a also indicates other subject account information such as name of issuing bank 41, billing information 44, n-digit code 26 and whether the account is active 46. For the latter, a flag may indicate a reported lost or stolen credit card and hence inactive or halted account status. The record 40a also indicates names of authorized users 48a (e.g., account/card owner and/or others).

The record 40b for the identity data member (second card 30) has similar fields 41b, 42b, 44b, 46b, 48b of information as above. The field or flag indicating account status 46b is set to "inactive", or "identity purpose only" or the like. This enables authentication server 80 to send a proper "non-authorized transaction" response to a second card 30 being read out of turn (i.e., before a first card 20) as mentioned above. In addition, the names of authorized users 48b and n-digit code 36 are indexed, linked or otherwise cross-referenced to the records 40 of qualifying first card 20 (as indicated by dashed lines) that the second card 30 is usable with (to authenticate). This enables the authentication server 80 (and/or card reader 10 program) to respond to the reading of the second card 30 subsequent to the reading of a first card 20 by matching authorized users data 48a, b.

The foregoing is for example and not limitation of the present invention. Other configurations, indications, and programming are suitable.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for conducting a transaction using a magnetic card reader comprising:
a first electromagnetically read card with a respective data carrying magnetic stripe, the first card accessing a corresponding account having an authorized user of the account as authorized by a financial institution on which the first card and corresponding account are drawn;
a second electromagnetically or electronically read card with a respective data carrying portion, the second card being universally usable, at different points of sales, in verifying identity of the authorized user across one or more qualifying cards including the first card for more than one transaction, each qualifying card having a respective account of the authorized user drawn at a respective financial institution, different accounts of the authorized user corresponding to different qualifying cards, and the second card carrying identity data of the authorized user, as authorized by the respective financial institutions, with respect to each respective account corresponding to the qualifying cards including account of the first card,
the first and second cards being read by a card reader, at a point of sales during a transaction in a manner such that a credit card processing center remote from the point of sales processes authorization of at least the first card while the second card looks at account authorization of the first card and verifies identity of the authorized user as a valid person as authorized by the respective financial institution to access the corresponding account of the first card, and thus validates the authorized user using the first card as payment to complete the transaction.

2. A system as claimed in claim 1 wherein the first and second cards are read by the card reader in tandem, in ordered series, or in cooperation with each other.

3. A system as claimed in claim 1 wherein the second card is universally usable with other credit, debit or other transaction type cards of the authorized user in addition to the first card.

4. A system as claimed in claim 1 wherein at least one of the first and second cards employs a respective data carrying magnetic stripe, a digital processor unit, or a radio-frequency identification (RF) unit.

5. A system as claimed in claim 1 wherein the second card enables request of credit history of the authorized user to be made.

6. A system as claimed in claim 1 wherein the second electromagnetically read card provides a digital image of the authorized user.

7. A system as claimed in claim 6 wherein the digital image may be updated by one of the authorized user and an account owner.

8. A system as claimed in claim 1 wherein the first or second card uses multiple magnetic stripes for data.

9. A system as claimed in claim 1 wherein the second card employs a magnetic stripe as the respective data carrying portion; and
wherein the respective data carrying magnetic stripe of the first or second card uses a Track 1 and a Track 2 for storing data.

10. A system as claimed in claim 9 wherein Track 1 and Track 2 contains a 7-bit alphanumeric characters or a 5-bit numeric characters.

11. A method for conducting a transaction using a magnetic card reader comprising:
during a transaction, accessing an account of an authorized user using, at a point of sales, a first electromagnetically read card with a respective data carrying magnetic stripe, the account being of the authorized user as authorized by a financial institution on which the first card and the account are drawn;
verifying identity of the authorized user of the account corresponding to the first card using, at the point of sales, a second electromagnetically or electronically read card with a respective data carrying portion, the second card being universally usable, at different points of sales, in verifying identity of the authorized user across one or more qualifying cards including the first card for more than one transaction, each qualifying card having a respective account of the authorized user drawn at a respective financial institution, different accounts of the authorized user corresponding to different qualifying cards, and the second card magnetically carrying identity data of the authorized user, as authorized by the respective financial institutions, with respect to each respective account corresponding to the qualifying cards including account of the first card and;
based on the second card looking at account authorization of the first card and verifying identity of the authorized user as being authorized by the respective financial institution to access the corresponding account of the first card while a credit card processing center remote from the point of sales authorizes the transaction, validating said accessing of the account of the first card by the authorized user, wherein the first and second cards are read by a card reader at the point of sales during the transaction.

12. The method of claim 11 wherein the first and second cards are read by a card reader in tandem, in ordered series, or in cooperation with each other.

13. The method of claim 11 wherein the second card is universally usable with other credit, debit or other transaction type cards of the authorized user in addition to the first card.

14. The method of claim 11 wherein at least one of the first and second cards employs a respective data carrying magnetic stripe, a digital processor unit, or a radio-frequency (RF) unit.

15. The method of claim 11 further comprising requesting credit history of the authorized user using the second card.

16. A method as claimed in claim 11 further comprising requesting a digital image of the authorized user using the second card.

17. A method as claimed in claim 16 further comprising updating the digital image of the authorized user.

18. A method as claimed in claim 11 wherein the first or second card uses multiple magnetic stripes for data.

19. A method as claimed in claim 11 wherein the respective data carrying portion of the second card is a magnetic stripe; and the respective data carrying magnetic stripe of the first or second card uses a Track 1 and a Track 2 for storing data.

20. A method as claimed in claim 19 wherein Track 1 and Track 2 contains a 7-bit alphanumeric characters or a 5-bit numeric characters.

21. A system for conducting a transaction using a magnetic card reader comprising:
a first electromagnetically read card with a respective data carrying magnetic stripe, the first card accessing a corresponding account having an authorized user of the account as authorized by a financial institution which issued the first card and corresponding account;
a second electromagnetically or electronically read card with a respective data carrying portion, the second card being universally usable, at different points of sales, in verifying identity of the authorized user across one or more qualifying cards including the first card for more than one transaction, each qualifying card having a respective account of the authorized user issued by a respective financial institution, different accounts of the authorized user corresponding to different qualifying cards, and the second card carrying identity data of the authorized user, as authorized by the respective financial institutions, with respect to each respective account corresponding to the qualifying cards including account of the first card,
the first and second cards being read by a card reader, at a point of sales, during a transaction in a manner such that a credit card processing center remote from the point of sales processes authorization of at least the first card while the second card looks at account authorization of the first card and verifies identity of the authorized user as a valid person as authorized by the respective financial institution to access the corresponding account of the first card, and thus validates the authorized user using the first card as payment to complete the transaction, wherein each qualifying card is any one of a credit card, debit card and monetary transaction type card.

22. A system as claimed in claim 21 wherein the second card is configured to be universally usable across two or more qualifying cards including the first card for more than one transaction.

* * * * *